(12) United States Patent
Nishi et al.

(10) Patent No.: US 9,603,002 B2  
(45) Date of Patent: Mar. 21, 2017

(54) METHOD FOR SWITCHING A SUBSCRIPTION FROM A FIRST MNO TO A SECOND MNO

(75) Inventors: Kenji Nishi, Issy les Moulineaux (FR); Yannick Burianne, Clamart (FR)

(73) Assignee: GEMALTO SA, Meudon (FR)

( * ) Notice: Subject to any disclaimer, the term of this patent is extended or adjusted under 35 U.S.C. 154(b) by 167 days.

(21) Appl. No.: 14/239,784

(22) PCT Filed: Jul. 20, 2012

(86) PCT No.: PCT/EP2012/064271  
§ 371 (c)(1),  
(2), (4) Date: Feb. 19, 2014

(87) PCT Pub. No.: WO2013/026639  
PCT Pub. Date: Feb. 28, 2013

(65) Prior Publication Data  
US 2014/0206338 A1    Jul. 24, 2014

(30) Foreign Application Priority Data  
Aug. 19, 2011  (EP) ..................................... 11306057

(51) Int. Cl.  
*H04W 8/08* (2009.01)  
*H04W 8/26* (2009.01)  
*H04W 12/04* (2009.01)  
*H04W 8/28* (2009.01)

(52) U.S. Cl.  
CPC ............. *H04W 8/08* (2013.01); *H04W 8/265* (2013.01); *H04W 12/04* (2013.01); *H04W 8/28* (2013.01)

(58) Field of Classification Search  
CPC ......... H04W 8/08; H04W 8/28; H04W 8/265; H04W 12/04  
See application file for complete search history.

(56) References Cited

U.S. PATENT DOCUMENTS

| | | | |
|---|---|---|---|
| 2001/0037357 A1* | 11/2001 | Anzai | G11B 20/00695 709/203 |
| 2003/0041253 A1* | 2/2003 | Matsui | G06F 12/0246 713/189 |
| 2004/0087305 A1 | 5/2004 | Jiang et al. | |
| 2007/0198698 A1* | 8/2007 | Boyd | G06F 17/30902 709/224 |
| 2009/0163175 A1* | 6/2009 | Shi | H04W 8/205 455/411 |

(Continued)

FOREIGN PATENT DOCUMENTS

GB    EP2063378 A1    5/2009

OTHER PUBLICATIONS

PCT/EP2012/064271, International Search Report, Sep. 3, 2012, European Patent Office, P.B. 5818 Patentlaan 2 NL—2280 HV Rijswijk.

*Primary Examiner* — Dinh P Nguyen  
(74) *Attorney, Agent, or Firm* — The Jansson Firm; Pehr B. Jansson

(57) ABSTRACT

The invention relates to a method for switching a subscription of a user from a first MNO (1) to a second MNO (2), characterized in that it comprises requesting to a remoter server switching from the first MNO to the second MNO and temporary storing data updates related to the second MNO in a dedicated file.

20 Claims, 3 Drawing Sheets

(56) References Cited

U.S. PATENT DOCUMENTS

| | | | |
|---|---|---|---|
| 2009/0191843 A1* | 7/2009 | Mardiks | H04W 4/00 |
| | | | 455/405 |
| 2010/0291898 A1 | 11/2010 | Sanding et al. | |
| 2011/0003590 A1 | 1/2011 | Yoon et al. | |
| 2013/0067057 A1* | 3/2013 | Falken | H04L 65/1063 |
| | | | 709/223 |

* cited by examiner

METHOD FOR SWITCHING A SUBSCRIPTION FROM A FIRST MNO TO A SECOND MNO

FIELD OF THE INVENTION

The present invention relates generally mobile communication networks and more specifically to a method from switching a subscription from a first mobile communication networks to a second mobile communication networks.

BACKGROUND OF THE INVENTION

A subscription switch from one MNO (Mobile Network) to another is a sensitive operation. The moment when the user confirms the subscription switch is extremely important because it also means the change of contract from the first MNO to the second MNO. When failed, a user may lose connection to any mobile network. Therefore if any problem occurs during the process, the entire system may collapse. Indeed there can be a service disruption, due to a network disconnection, a communication loss.

There is then a need for ensuring that the subscription switch occurs properly according to user's acknowledgement.

It is then an object of the invention to provide a reliable method for executing the subscription switch.

Thereto, the present invention provides a method for switching a subscription of a user from a first MNO to a second MNO, characterized in that it comprises requesting to a remoter server switching from the first MNO to the second MNO and temporary storing data updates related to the second MNO in a dedicated file.

According to other aspects of the invention,
- the method may comprise setting a first flag, said first flag being configured to be set to "on" when the user authorizes the switch from the first MNO to the second MNO; the method may comprise a step of requesting the user's switching authorization after temporary storing of data updates is completed,
- the method may comprise setting a second flag, said second flag being configured to be set to "on" when the temporary storing of data updates is complete so as to un-authorize modification of data related to the first MNO to be updated;
- the method may comprise setting said second flag to "off" after the first flag is set to "on", and then processing a final update, said final update consisting in updating data related to the first MNO by data updates related to the second MNO;
- the method may comprise setting the first flag to "off" when the final update;
- the data updates may comprise data for attaching the user to the second MNO;
- the method may comprise clearing temporarily stored data updates and clearing flags relating to the subscription switch when said subscription switch is aborted;
- the method may comprise requesting the mobile device to refresh its memory;
- the method may comprise sending a message to the remote server so as said remote server informs the first MNO of the end of the subscription of the user and so as the second MNO processes the switch at its side.

The invention also provides a subscription switch system comprising a first MNO, a second MNO, a mobile device, said mobile device being attached to the first MNO, a token, said token comprising subscriber's identity data related to the first MNO and adapted to communicate with said mobile device, a remote server adapted to communicate with the first MNO, the second MNO, the token, characterized in that the token comprises means for starting and managing the subscription switch from the first MNO to a second MNO according to the method.

This invention advantageously brings robustness and reliability of subscription switch process and minimizes the risk of service disruption caused by any error occurs during the switch.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawings described below.

DETAILED DESCRIPTION

The present invention may be understood according to the detailed description provided herein.

Figure 1:
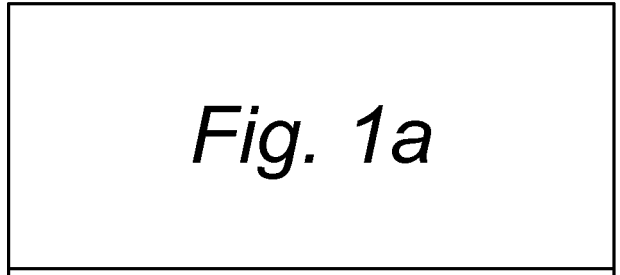
FIG. 1 schematically shows a flowchart diagram of the method of the invention.
Figure 1:
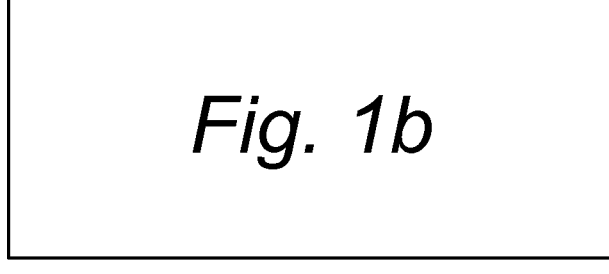
Figure 1A:
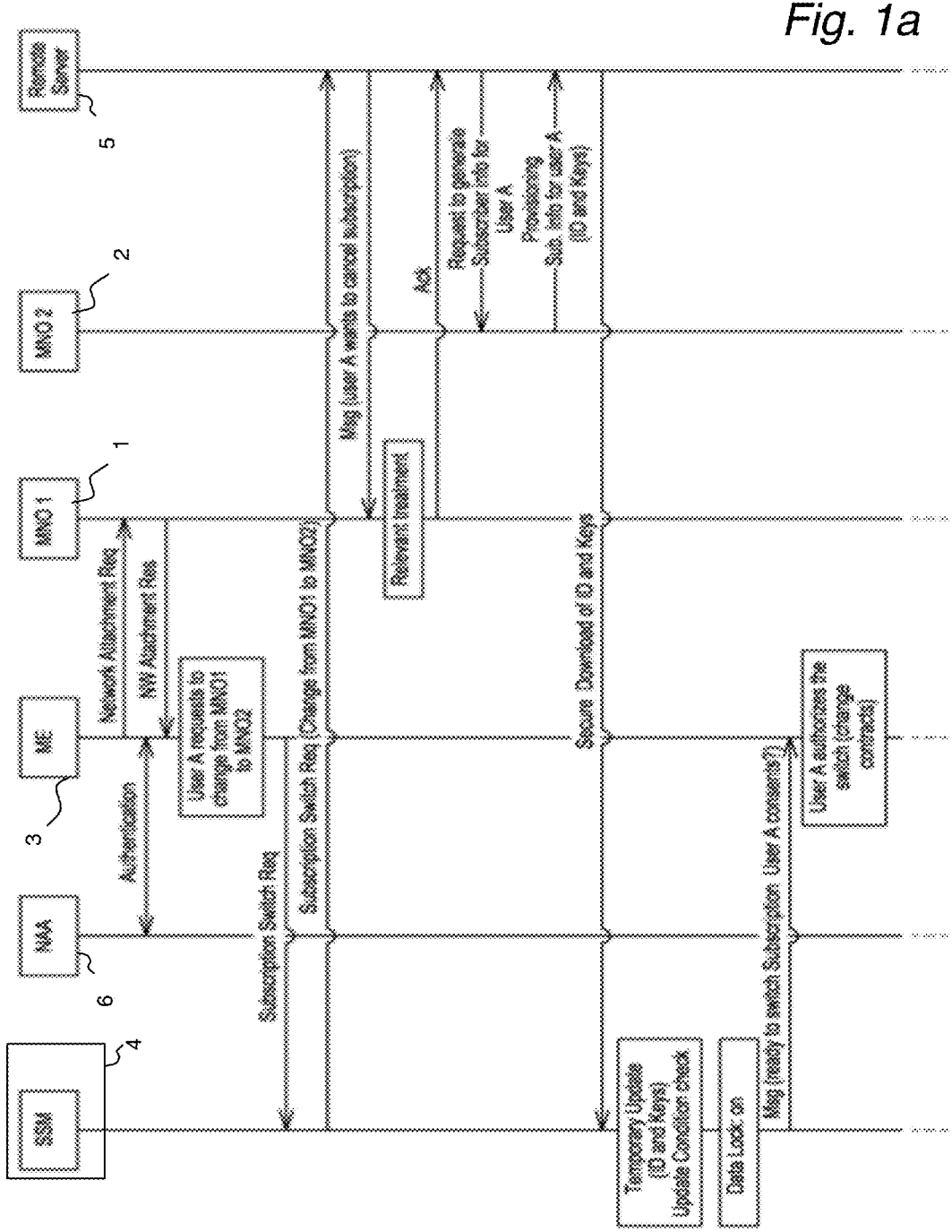
Figure 1B:
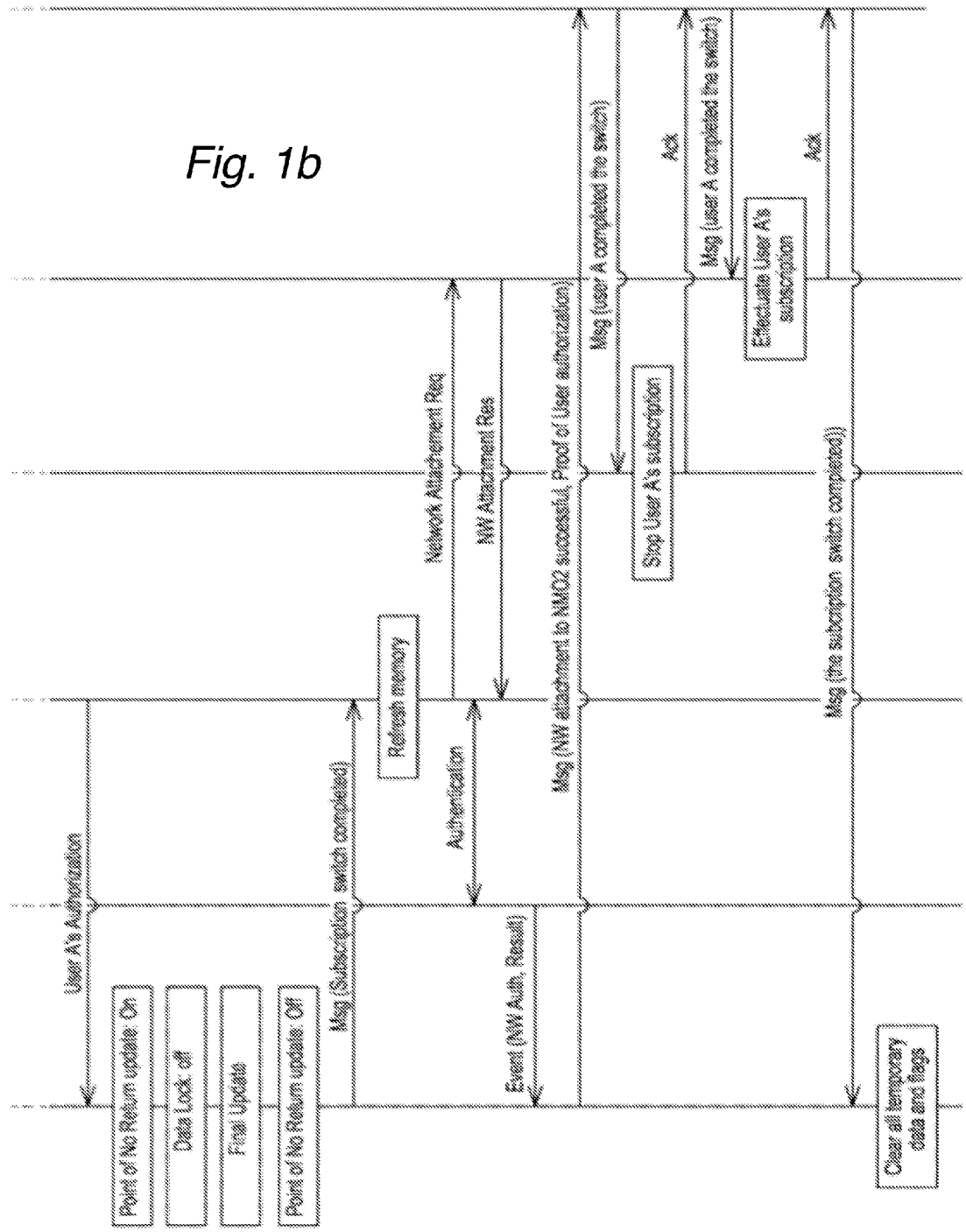

Shown in FIG. 1 is a subscription switch system comprising a first MNO 1, a second MNO 2, a mobile device 3 of a subscriber or user, a token 4, a remote service 5.

The remote server 5 is adapted to communicate with the first MNO 1, the second MNO 2, and the token 4 via network connection capability provided by the mobile device 3.

The subscriber has a subscription before the MNO 1, and therefore the mobile device 3 and the token 4 are attached to the first MNO 1.

The token 4 is adapted to communicate with said mobile device 3. The token 4 is a subscriber identity token, such as for example a UICC, (U)SIM, ISIM, CSIM, R-UIM, . . . and comprises subscriber's identity data related to the first MNO 1. It comprises means for starting and managing the subscription switch from the first MNO 1 to a second MNO 2.

The means for starting and managing the subscription switch or also called hereinafter Subscription Switch Management agent or SSM, comprise subscriber identities, network authentication credentials related to first MNO 1, such as for example the IMSI and authentication keys related to first MNO 1, authentication commands, and may comprise other credentials, for example, keys used to remotely manage the token in a secure way, also called OTA keys.

Up on either subscriber request or MNO initiation, the remote server 5 (RS), such for example an OTA server, sends a request to the SSM to start the subscription switch process from the first MNO 1 to the second MNO 2.

The SSM first checks if it already possesses necessary data for the subscription switch. Typically, if the SSM does not yet possess new subscription data for the second MNO 2, i.e. new subscriber identity and new network authentication credential, it requests the remote server to download those data into the SSM.

The method according to the invention comprises requesting to a remoter server switching from the first MNO to the second MNO. For doing so, the method comprises a step wherein the subscriber or user requests for subscription change from the first MNO 1 to the second MNO 2. The mobile device 3 or the subscriber identity token 4 sends a message to the remote server 5.

The remote server 5 requests the second MNO 2 or a Provisioning System of the second MNO 2 to create a new account for the subscriber. The new account comprises new subscription data, i.e. for example new subscriber identities such as a new IMSI (IMSI_2) and new authentication key(s) (AuthKeys_2 . . . ) linked to the second MNO 2. The second MNO 2 or the Provisioning System of the second MNO 2 provides the remote server 5 with new subscription data (IMSI_2, AuthKeys_2). The remote server 5 then sends data updates which comprise data for attaching the user 10 to the second MNO 2, i.e. the new subscription data, including IMSI_2 and AuthKeys_2 to the token 4.

In order to avoid any problem during the process and to realize a reliable execution of these sensitive operations, the method advantageously comprises temporary storing data updates related to the second MNO 2 in a dedicated file. Therefore, the token 4 temporarily stores at least IMSI_2 and AuthKeys_2. The method then comprises a step of requesting the user's switching authorization after temporary storing of data updates is completed. Up on reception of the new subscription data, the token 4 verifies that the conditions to complete the update are satisfied. It for example examines the data structure and size, the access condition to perform the update or the data storage location.

The token 4 asks the subscriber for final confirmation to switch the subscription.

It will be well understood that if the user can delegate or substitute this confirmation by other means, it is also possible to skip this step or to replace this step with another method. For instance, if the subscription switch process is controlled by MNO, the MNO may get user's consent through the other way, e.g. Call center operation. In such a case, the confirmation may be provided by a remote server on behalf of the user.

As soon as the user authorizes the subscription switch, it is highly desirable that the updates definitely succeed. The method comprises setting a first flag, said first flag being configured to be set to "on" when the user authorizes the switch from the first MNO 1 to the second MNO 2. This flag determines a "Point of No Return". Unlikely usual roll-back mechanism, once this flag is set to "on", data relating to the first MNO 1 will be updated by data relating to the second MNO 2 even if power is down in the middle of the update. In order to realize this "Point of No Return feature", the temporary data storage is advantageous as a proper storage of temporary data enables the token 4 to finish the incomplete update later on in case of power down in the middle of the update.

The method also comprises setting a second flag, said second flag being configured to be set to "on" when the temporary storing of data updates is complete so as to un-authorize modification of data related to the first MNO 1 to be updated. This flag specifies whether the data area subject to the atomic update shall be locked or not. Here, "lock" means that for instance, the file "EF_IMSI" cannot be updated, modified, or deleted while this flag is set to "on". This advantageously minimizes the risk of unexpected error caused by a state change of the target data between the temporary update and the final update.

The method comprises setting said the second flag to "off" after the first flag is set to "on" after the authorization of the switch by the user and then processing a final update, said final update consisting in updating data related to the first MNO 1 by data updates related to the second MNO 2.

After the update of the data in the token 4, the first flag is set to "off".

The method comprises clearing temporarily stored data updates and clearing flags relating to the subscription switch when said subscription switch is aborted due to the subscriber or to the process itself.

The token 4 then informs the mobile device 3 that the subscription switch is completed, and requests the mobile device 3 to refresh its memory. This step is necessary as the mobile device 3 reads out the subscription data at the power on. The mobile device 3 normally stores the data in its memory. For instance, the mobile device 3 stores the IMSI value at the power on and uses the stored data at each network attachment until the memory is refreshed, e.g. at the power off. The mobile device 3 refreshes its memory only when it is explicitly asked to re-read the IMSI from USIM or it is rebooted.

Additionally, since there is possible communication error during the process, the method also comprises an event, which informs the SSM of reception of authentication challenge from the network and occurrence of authentication procedure. The event is generated when the subscriber identify token 4 receives an AUTHENTICATE command from the network and it processes the authentication command. The event provides the SSM with the following information: targeted NAA 6, type of authentication, result of authentication, i.e. successful, failure, synchronization error . . . , optionally subscription ID and Authentication vector.

Based on the information provided by the event generator, the SSM can judge if the subscription switch was effective and completed on the network side. If it judges that the subscription switch has not been completed, e.g. authentication failure with new subscription data, the SSM tries to switch back to the original subscription in order to restore the connection with the network. This allows the SSM to report the failure and to retry the entire switch process from the beginning or to resume from a certain stage.

When the network authentication with new keys is successful, the token 4 reports the result to the remote server 5. The method comprises sending a message to the remote server so as said remote server informs the first MNO 1 of the end of the subscription of the user and so as the second MNO 2 processes the switch at its side.

Optionally, the token generates a signature proving that the user has authorized the switch.

The method is advantageously operated in an atomic manner such that the operation is complete even when an interruption occurs in the middle of its operation.

The invention claimed is:

1. A method for switching a subscription of a user from a first mobile network called first MNO to a second mobile network called second MNO, comprising the following steps:
   requesting to a remote server, by a Subscription Switch Management (SSM) agent comprised in a token configured to communicate with a mobile device, switching from the first MNO to the second MNO;
   checking, by the Subscription Switch Management, if it already possesses necessary data for the subscription switch, and if not:
   requesting to the second MNO by said remote server to create a new account for the user, said new account comprising new subscription data and new authentication data linked to the second MNO;
   sending, by the remote server to the token, data updates comprising the new subscription data and new authentication data;
   temporary storing in the token data updates related to the second MNO in a dedicated file;

requesting the user's switching authorization after temporary storing of data updates is completed, and based upon authorized, switching the subscription from the first MNO to the second MNO;

receiving and processing by the token an authentication command to generate an event for the subscription Switch Management (SSM) to judge if the subscription switch is effective and completed on the network side;

if the subscription is not effective and completed on the network side, switching back the subscription from the second MNO to the first MNO.

2. The method according to claim 1, further comprising setting a first flag, said first flag being configured to be set to "on" when the user authorizes the switch from the first MNO to the second MNO.

3. The method according to claim 2, further comprising setting a second flag, said second flag being configured to be set to "on" when the temporary storing of data updates is complete so as to unauthorise modification of data related to the first MNO to be updated.

4. The method according to claim 3, further comprising setting said second flag to "off" after the first flag is set to "on", and then processing a final update, said final update consisting in updating data related to the first MNO by data updates related to the second MNO.

5. The method according to claim 4, further comprising setting the first flag to "off" upon the final update.

6. The method according to claim 1 or 2, wherein data updates comprise data for attaching the user to the second MNO.

7. The method according to claim 2, further comprising clearing temporarily stored data updates and clearing flags relating to the subscription switch when said subscription switch is aborted.

8. The method according to claim 1 or 2, further comprising requesting the mobile device to refresh its memory.

9. The method according to claim 6, further comprising sending a message to the remote server so as said remote server informs the first MNO of the end of the subscription of the user and so as the second MNO processes the switch at its side.

10. A subscription switch system comprising
a first mobile network (MNO),
a second mobile network (MNO),
a mobile device, said mobile device being attached to the first MNO,
a token, said token comprising subscriber's identity data related to the first MNO and configured to communicate with said mobile device,
a remote server configured to communicate with the first MNO, the second MNO and the token, wherein the token comprises means for starting and managing the subscription switch from the first MNO to a second MNO, the token being configured to request to a remote server to switch from the first mobile network to the second mobile network and temporary storing data updates related to the second mobile network in a dedicated file,
the token being further configured to request the user's switching authorization after temporary storing of data updates is completed, and based upon authorized, switching the subscription from the first MNO to the second MNO, to receive and process the token an authentication command to generate an event for the Subscription Switch Management (SSM) to judge if the subscription switch is effective and completed on the network side, and if the subscription switch is not effective and completed on the network side, to switch back the subscription from the second MNO to the first MNO.

11. The method according to claim 3, further comprising setting said second flag to "off" after the first flag is set to "on", and then processing a final update, said final update consisting in updating data related to the first MNO by data updates related to the second MNO.

12. The method according to claim 2, further comprising requesting the mobile device to refresh its memory.

13. The method according to claim 12, further comprising sending a message to the remote server so as said remote server informs the first MNO of the end of the subscription of the user and so as the second MNO processes the switch at its side.

14. The subscription switch system of claim 10 wherein the token is further configured to set a first flag, said first flag being configured to be set to "on" when the user authorizes the switch from the first MNO to the second MNO.

15. The subscription switch system of claim 10 wherein the token is further configured to after temporary storing of data updates is completed, requesting authorization from the user to perform the switch of mobile networks.

16. The subscription switch system of claim 14 wherein the token is further configured to after temporary storing of data updates is completed, requesting authorization from the user to perform the switch of mobile networks.

17. The subscription switch system of claim 10 wherein the token is further configured to set a second flag, said second flag being configured to be set to "on" when the temporary storing of data updates is complete so as to unauthorise modification of data related to the first MNO to be updated.

18. The subscription switch system of claim 14 wherein the token is further configured to set a second flag, said second flag being configured to be set to "on" when the temporary storing of data updates is complete so as to unauthorise modification of data related to the first MNO to be updated.

19. A hardware token for communicating with a mobile device and allowing switching a subscription of a user from a first mobile network called first MNO to a second mobile network called second MNO, said hardware token being configured to:
request, to a remote server by a Subscription Switch Management (SSM) agent comprised in the token, to switch from the first MNO to the second MNO for the remote server to request to the second MNO the creation of anew account for the user, said new account comprising new subscription data and new authentication data linked to the second MNO;
receive from said remote server, data updates comprising said new subscription data and new authentication data;
store temporary data updates related to the second MNO in a dedicated file;
request the user's switching authorization after temporary storing of data updates is completed, and based upon authorized, switch the subscription from the first MNO to the second MNO;
receive and process by the token an authentication command to generate an event for the Subscription Switch Management (SSM) to judge if the subscription switch is effective and completed on the network side;
if the subscription switch is not effective and completed on the network side, switch back the subscription from the second MNO to the first MNO.

20. A remote server for switching a subscription of a user from a first mobile network called first MNO to a second mobile network called second MNO, said remote server being configured to:

receive a request from a Subscription Switch Management (SSM) agent comprised in a token configured to communicate with a mobile device, to switch from the first MNO to the second MNO;

request to the second MNO to create a new account for the user, said new account comprising new subscription data and new authentication data linked to the second MNO;

send to the token data updates comprising the new subscription data and new authentication data for said token to temporary store data updates related to the second MNO in a dedicated file and to request the user's switching authorization after temporary storing of data updates is completed;

send to the token an authentication command for it to be processed based on the new authentication data to generate an event for the Subscription Switch Management (SSM) to judge if the subscription switch is effective and completed on the network side and for the token to switch back the subscription from the second MNO to the first MNO) if subscription is not effective and completed on the network side.

* * * * *